(12) United States Patent
Movellan et al.

(10) Patent No.: US 9,443,167 B2
(45) Date of Patent: Sep. 13, 2016

(54) FILTER AND SHUTTER BASED ON IMAGE EMOTION CONTENT

(71) Applicant: Emotient, Inc., San Diego, CA (US)

(72) Inventors: Javier Movellan, La Jolla, CA (US); Ken Denman, Cherry Hills Village, CO (US); Joshua Susskind, La Jolla, CA (US)

(73) Assignee: Emotient, Inc., San Diego, CA (US)

( * ) Notice: Subject to any disclaimer, the term of this patent is extended or adjusted under 35 U.S.C. 154(b) by 0 days.

(21) Appl. No.: 14/451,409

(22) Filed: Aug. 4, 2014

(65) Prior Publication Data

US 2015/0036934 A1 Feb. 5, 2015

Related U.S. Application Data

(63) Continuation of application No. 61/861,868, filed on Aug. 2, 2013.

(51) Int. Cl.
  *G06K 9/00* (2006.01)
  *G06K 9/62* (2006.01)
  *H04N 5/232* (2006.01)

(52) U.S. Cl.
  CPC ........ *G06K 9/6202* (2013.01); *H04N 5/23219* (2013.01); *G06K 9/00302* (2013.01); *H04N 5/232* (2013.01)

(58) Field of Classification Search
  None
  See application file for complete search history.

(56) References Cited

U.S. PATENT DOCUMENTS

| 6,084,595 | A   |   | 7/2000  | Bach et al.     |              |
|-----------|-----|---|---------|-----------------|--------------|
| 7,450,740 | B2  | * | 11/2008 | Shah            | G06K 9/00288 |
|           |     |   |         |                 | 382/118      |
| 8,515,136 | B2  | * | 8/2013  | Mori et al.     | 382/118      |
| 2002/0001468 | A1 | * | 1/2002  | Kaku           | 396/310      |
| 2003/0133599 | A1 | * | 7/2003  | Tian et al.    | 382/118      |
| 2010/0086215 | A1 | * | 4/2010  | Bartlett       | G06K 9/00335 |
|           |     |   |         |                 | 382/197      |
| 2011/0032378 | A1 | * | 2/2011  | Kaneda         | 348/222.1    |
| 2012/0207402 | A1 |   | 8/2012  | Stojancic et al. |            |
| 2015/0049953 | A1 | * | 2/2015  | Movellan       | G06K 9/6253  |
|           |     |   |         |                 | 382/197      |

FOREIGN PATENT DOCUMENTS

JP   1996H08339445 A   12/1996

* cited by examiner

*Primary Examiner* — Wesley Tucker
(74) *Attorney, Agent, or Firm* — Blank Rome LLP

(57) ABSTRACT

A computer-implemented (including method implemented using laptop, desktop, mobile, and wearable devices) method for image filtering. The method includes analyzing each image to generate a content vector for the image; applying an interest operator to the content vector, the interest operator being based on a plurality of pictures with desirable characteristics, thereby obtaining an interest index for the image; comparing the interest index for the image to an interest threshold; and taking one or more actions or abstaining from one or more actions based on a result of the step of comparing. Also, related systems and articles of manufacture.

20 Claims, 3 Drawing Sheets

FILTER AND SHUTTER BASED ON IMAGE EMOTION CONTENT

CROSS-REFERENCE TO RELATED APPLICATION

This application claims priority from U.S. provisional patent application Ser. No. 61/861,868, entitled "FILTER AND SHUTTER BASED ON IMAGE EMOTION CONTENT", filed on Aug. 2, 2013, which for any and al purposes is hereby incorporated by reference in its entirety as if fully set forth herein, including text, figures, claims, tables, and computer program listing appendices (if present), and all other matter in the United States provisional patent application.

FIELD OF THE INVENTION

This document relates generally to apparatus, methods, and articles of manufacture for filtering and electronic shuttering images based on emotion content of the images.

BACKGROUND

Digital media storage has become inexpensive. Coupled with the widespread use of image capturing devices such as digital cameras and smartphones, inexpensive media storage enables people to accumulate easily thousands of pictures, at very low cost. This creates much clutter, with a large proportion of the stored images often presenting little or no interest to the user. There is a need to help curate large image collections, e.g., to filter out the images that likely present little interest to the user and/or others.

A somewhat related problem is that of choosing which images to capture from an ongoing scene in the first place. Many modern digital cameras can capture several high resolution images per second. Which of the images captured in a short period of time (such as less than ten seconds) should be saved? If they are all saved, a large number of highly redundant images may result. There is a need therefore to help select the images for shuttering, that is, select images for capture using electronic or even a mechanical shutter, and for saving images in non-transitory storage media.

SUMMARY

Embodiments described in this document are directed to methods, apparatus, and articles of manufacture that may satisfy one or more of the above described and other needs.

In an embodiment, a computer-implemented (including method implemented using laptop, desktop, mobile, and wearable devices) method for image filtering includes analyzing each image to generate a content vector for the image; applying an interest operator to the content vector, the interest operator being based on a plurality of pictures with desirable characteristics, thereby obtaining an interest index for the image; comparing the interest index for the image to an interest threshold; and taking one or more actions or abstaining from one or more actions based on a result of the step of comparing.

In an embodiment, a computer-based system is configured to analyze each image of a plurality of images to generate a content vector for the image, apply an interest operator to the content vector, the interest operator being based on a plurality of pictures with desirable characteristics, to obtain an interest index for the image, compare the interest index for the image to an interest threshold, to obtain a result of comparison between the interest index for the image and the interest threshold, and take one or more actions or abstain from one or more actions based on the result.

In an embodiment, the interest operator is predominantly based on content of one or more expressions of one or more faces in the plurality of images, and the desirable characteristics relate to emotional content or sentiment in the expressions. In an embodiment, the plurality of images are captured by a camera viewing an audience of an event.

In an embodiment, the interest operator is predominantly based on content of one or more human appearance characteristics, action unites, and/or low level features in the plurality of images.

In an embodiment, non-transitory machine-readable memory is embedded with computer code of a computer-implemented method for image filtering. The method includes analyzing each image to generate a content vector for the image; applying an interest operator to the content vector, the interest operator being based on a plurality of pictures with desirable characteristics, thereby obtaining an interest index for the image; comparing the interest index for the image to an interest threshold; and taking one or more actions based on a result of the step of comparing These and other features and aspects of the present invention will be better understood with reference to the following description, drawings, and appended claims.

DETAILED DESCRIPTION

Figure 1:
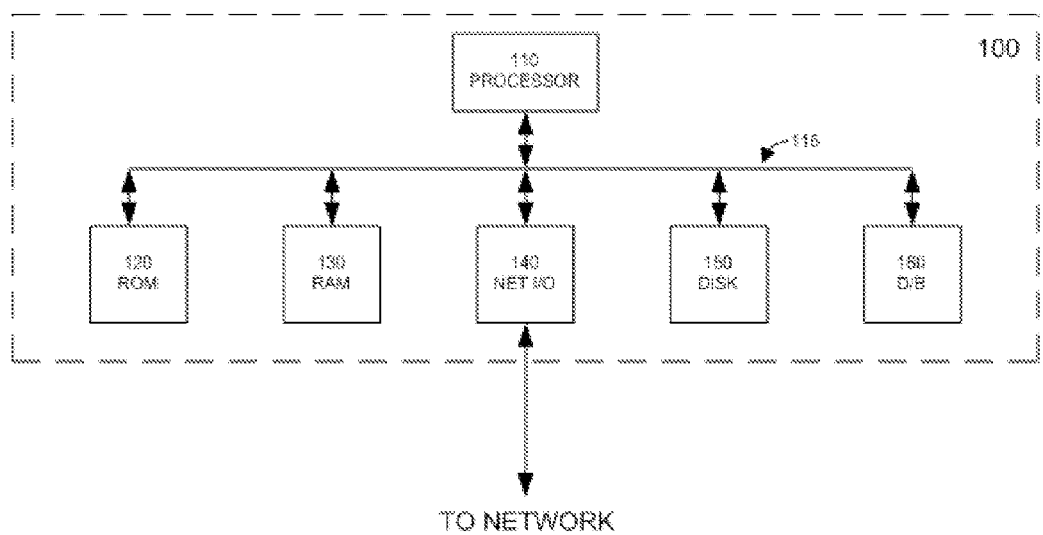
FIG. 1 is a simplified block diagram representation of a computer-based system configured in accordance with selected aspects of the present description.

In this document, the words "embodiment," "variant," "example," and similar expressions refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar expressions and phrases may be used to indicate one of a number of different possible embodiments. The number of possible embodiments/variants/examples is not necessarily limited to two or any other quantity. Characterization of an item as "exemplary" means that the item is used as an example. Such characterization of an embodiment/variant/example does not necessarily mean that the embodiment/variant/example is a preferred one; the embodiment/variant/example may but need not be a currently preferred one. All embodiments/variants/examples are described for illustration purposes and are not necessarily strictly limiting.

The words "couple," "connect," and similar expressions with their inflectional morphemes do not necessarily import an immediate or direct connection, but include within their meaning connections through mediate elements.

References to "images," "photographs," "photos," "pictures," and analogous words/expressions may be used interchangeably, regardless of the source of the images/photographs/pictures.

"Facial expressions" as used in this document signifies the primary facial expressions of emotion (such as Anger, Contempt, Disgust, Fear, Happiness, Sadness, Surprise, Neutral); expressions of affective state of interest (such as boredom, interest, engagement); so-called "facial action units" (movements of a subset of facial muscles, including movement of individual muscles, such as the action units used in the facial action coding system); and gestures/poses (such as tilting head, raising and lowering eyebrows, eye blinking, nose wrinkling, chin supported by hand).

Automated facial expression recognition and related subject matter are described in a number of commonly-owned patent applications, including (1) application entitled SYSTEM FOR COLLECTING MACHINE LEARNING TRAINING DATA FOR FACIAL EXPRESSION RECOGNITION, by Javier R. Movellan, et al., Ser. No. 61/762,820, filed on or about 8 Feb. 2013; (2) application entitled ACTIVE DATA ACQUISITION FOR DEVELOPMENT AND CONTINUOUS IMPROVEMENT OF MACHINE PERCEPTION SYSTEMS, by Javier R. Movellan, et al., Ser. No. 61/763,431, filed on or about 11 Feb. 2013; (3) application entitled EVALUATION OF RESPONSES TO SENSORY STIMULI USING FACIAL EXPRESSION RECOGNITION, Javier R. Movellan, et al., Ser. No. 61/763,657, filed on or about 12 Feb. 2013; (4) application entitled AUTOMATIC FACIAL EXPRESSION MEASUREMENT AND MACHINE LEARNING FOR ASSESSMENT OF MENTAL ILLNESS AND EVALUATION OF TREATMENT, by Javier R. Movellan, et al., Ser. No. 61/763,694, filed on or about 12 Feb. 2013; (5) application entitled ESTIMATION OF AFFECTIVE VALENCE AND AROUSAL WITH AUTOMATIC FACIAL EXPRESSION MEASUREMENT, Ser. No. 61/764,442, filed on or about 13 Feb. 2013, by Javier R. Movellan, et al.; (6) application entitled FACIAL EXPRESSION TRAINING USING FEEDBACK FROM AUTOMATIC FACIAL EXPRESSION RECOGNITION, filed on or about 15 Feb. 2013, by Javier R. Movellan, et al., Ser. No. 61/765,570; and (7) application entitled QUALITY CONTROL FOR LABELING MACHINE LEARNING TRAINING EXAMPLES, Ser. No. 61/765,671, filed on or about 15 Feb. 2013, by Javier R. Movellan, et al; (8) application entitled AUTOMATIC ANALYSIS OF NON-VERBAL RAPPORT, Ser. No. 61/766,866, filed on or about 20 Feb. 2013, by Javier R. Movellan, et al; and (9) application entitled SPATIAL ORGANIZATION OF IMAGES BASED ON EMOTION FACE CLOUDS, Ser. No. 61/831,610, filed on or about 5 Jun. 2013, by Javier R. Movellan, et al. Each of these provisional applications is incorporated herein by reference in its entirety, including claims, tables, computer code and all other matter in the patent applications.

"Human appearance characteristic" includes facial expressions and additional appearance features, such as ethnicity, gender, attractiveness, apparent age, and stylistic characteristics (clothing, shoes, hair styles).

"Low level features" are low level in the sense that they are not attributes used in everyday life language to describe facial information, such as eyes, chin, cheeks, brows, forehead, hair, nose, ears, gender, age, ethnicity, etc. Examples of low level features include Gabor orientation energy, Gabor scale energy, Gabor phase, and Haar wavelet outputs.

Other and further explicit and implicit definitions and clarifications of definitions may be found throughout this document.

Reference will be made in detail to several embodiments that are illustrated in the accompanying drawings. Same reference numerals are used in the drawings and the description to refer to the same apparatus elements and method steps. The drawings are in a simplified form, not to scale, and omit apparatus elements and method steps that can be added to the described systems and methods, while possibly including certain optional elements and steps.

FIG. 1 is a simplified block diagram representation of a computer-based system 100, configured in accordance with selected aspects of the present description to filter pictures based on emotion content of the faces in the pictures, and/or other human appearance characteristics, and or low level features. FIG. 1 does not show many hardware and software modules of the system 100, and may omit physical and logical connections. The system 100 may be implemented as a special purpose data processor, a general-purpose computer, a computer system, or a group of networked computers or computer systems configured to perform the steps of the methods described in this document. In some embodiments, the system 100 is built on a personal computer platform, such as a Wintel PC, a Linux computer, or a Mac computer. The personal computer may be a desktop or a notebook computer. The system 100 may function as a server computer. In some embodiments, the system 100 is implemented as a plurality of computers interconnected by a network. In embodiments, the system 100 is implemented as part of an image capture device, such as a camera or a smartphone.

As shown in FIG. 1, the system 100 includes a processor 110, read only memory (ROM) module 120, random access memory (RAM) module 130, network interface 140, a mass storage device 150, and a database 160. These components are coupled together by a bus 115. In the illustrated embodiment, the processor 110 may be a microprocessor, and the mass storage device 150 may be a magnetic disk drive. The mass storage device 150 and each of the memory modules 120 and 130 are connected to the processor 110 to allow the processor 110 to write data into and read data from these storage and memory devices. The network interface 140 couples the processor 110 to a network, for example, the Internet.

The database 160 may be used for storing and organizing one or more collections of images, including the images being filtered. The database 160 may be a physically separate system coupled to the processor 110. In alternative embodiments, the processor 110 and the mass storage device 150 may be configured to perform the functions of the database 160.

The processor 110 may read and execute program code instructions stored in the ROM module 120, the RAM module 130, and/or the storage device 150. Under control of the program code, the processor 110 may configure the system 100 to perform the steps of the methods described or mentioned in this document. In addition to the ROM/RAM modules 120/130 and the storage device 150, the program code instructions may be stored in other machine-readable non-transitory storage media, such as additional hard drives, floppy diskettes, CD-ROMs, DVDs, Flash memories, and similar devices. The program code can also be transmitted over a transmission medium, for example, over electrical wiring or cabling, through optical fiber, wirelessly, or by any other form of physical transmission. The transmission can take place over a dedicated link between telecommunication devices, or through a wide area or a local area network, such as the Internet, an intranet, extranet, or any other kind of public or private network. The program code may also be downloaded into the system 100 through the network interface 140 or another network interface.

The methods described in this document may also be performed in a networked environment, where the pictures are stored on one device (or one set of devices), and analyzed/filtered by a second device (or a second set of devices), and the first device or set is connected to the second device or set by one or more networks. Thus, the methods may be performed on a stand-alone user device—a personal computer, smartphone, tablet, digital camera, or any other computing device—or over a network.

Figure 2:
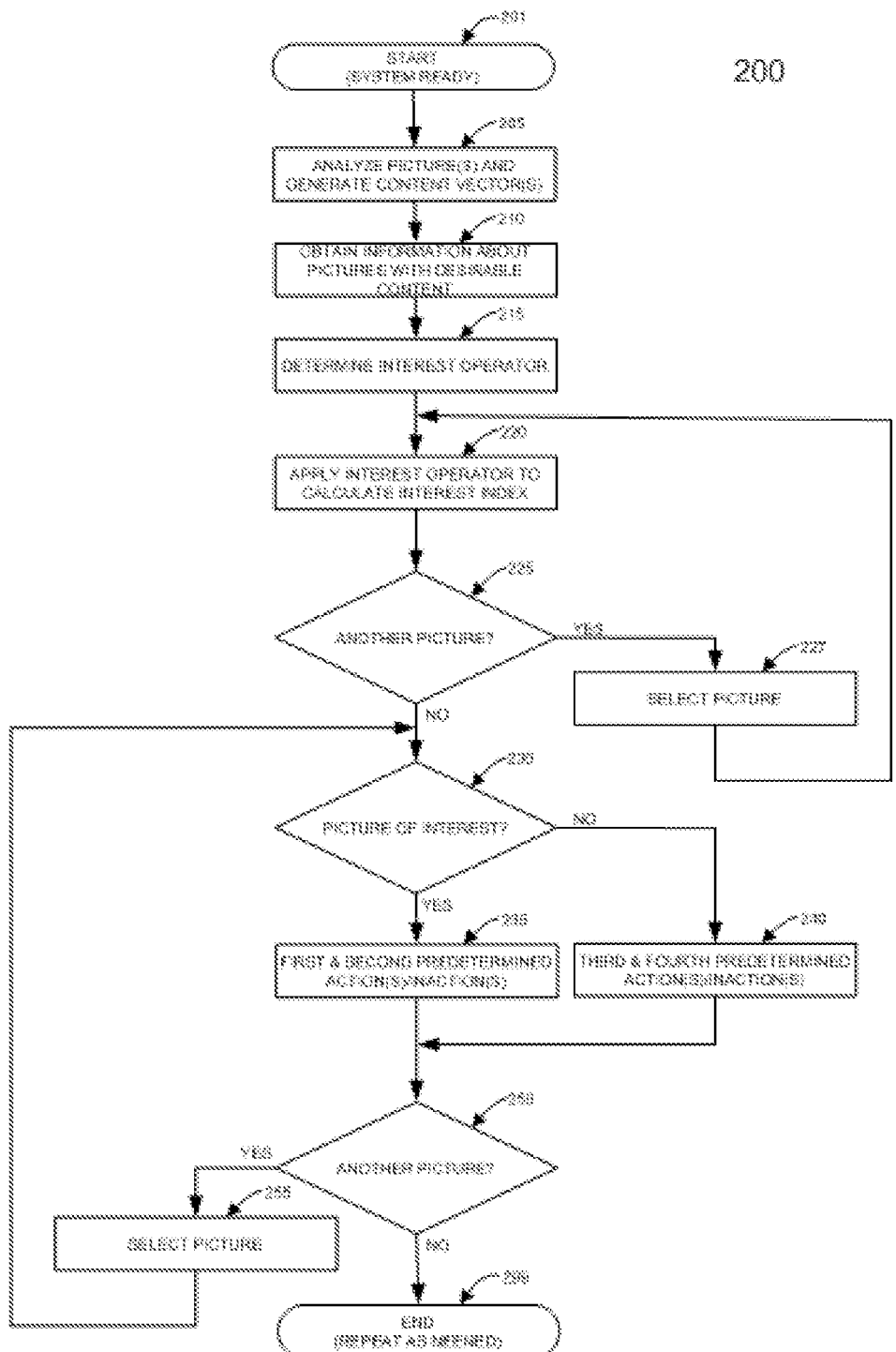
FIG. 2 illustrates selected steps/blocks of a process for filtering pictures.

FIG. 2 illustrates selected steps of a process 200 for filtering a collection of pictures stored in one of the storage or memory devices of the system 100, for example, in the database 160. In the process 200, the collection of pictures to be filtered includes a number of image which contain one or human faces, and the filtering may be done based at least in part on the emotional content in the faces.

At flow point 201, the system 100 is powered up and configured to perform the steps of the process 200.

In step 205, the system 100 analyzes the pictures in the collection for the emotional content and/or other content in each of the pictures, e.g., human appearance characteristics, action units, low level features. For example, each of the pictures may be analyzed by a collection of classifiers of facial expressions and/or low level features. Each of the classifiers may be configured and trained to produce a signal output (whether continuous or discrete) in accordance with the presence or absence of a particular emotion displayed by the face (or faces, as the case may be) in the picture, action unit, and/or low level feature. Each of the classifiers may be configured and trained for a different emotion, including, for example, the seven primary emotions (Anger, Contempt, Disgust, Fear, Happiness, Sadness, Surprise), as well as neutral expressions, and expression of affective state of interest (such as boredom, interest, engagement). Additional classifiers may be configured and trained to produce signal output corresponding to other human appearance characteristics, which are described above; for example, the additional classifiers may be configured for detecting configuration of Action Units, from the Facial Action Coding System (FACS), which provide a comprehensive description of all (or many) distinguishable human facial expressions. We have described certain aspects of such classifiers in the patent applications listed above, which are incorporated by reference.

For each picture, a vector of values (which are inherently ordered in a vector) of the classifiers is thus obtained.

In step 210, the system obtains the list of pictures with desirable emotional content and/or other desirable human appearance characteristics. In embodiments, the system 100 allows the user to select/indicate the pictures with the desirable emotional content and/or other desirable human appearance characteristics. In embodiments, the system reads the list or information identifying the individual pictures with the desirable characteristics from some local storage (e.g., the database 160, the mass storage device 150, the memory modules 120/130) or from a remote source (e.g., through the network interface 140).

In embodiments, the pictures with the desirable characteristics are determined based on a user's choice to save rather than delete images. In a camera, for example, the user may review pictures immediately after taking each picture, and then choose to save or delete each picture. The saved pictures may be considered to be the pictures with the desirable characteristics.

The pictures with the desirable characteristics may be chosen by the user, another person, two or more persons (possibly including the user), or be pre-selected by some sample of the general population or some portion thereof, who rate the interest value of a set of images. The pictures with the desirable characteristics may be part of the collection of pictures to be filtered, or not. In the latter case, the pictures with the desirable characteristics may be analyzed in a way identical or analogous to the analysis of the step 205, to obtain vectors of ordered values of the classifiers used for analyzing the pictures with the desirable characteristics.

In collaborative filtering embodiments, the pictures with desirable characteristics may be based on expressed preferences of multiple persons with similarities in picture preferences, backgrounds, demographics, and/or other user characteristics. In examples, for each person a dataset of the images the person likes (or information derived from such dataset, e.g., the vectors of the pictures in the dataset) is kept. This dataset is used to estimate the interest of a new image. If one of these persons is similar to another person, then the picture interests of the first person may be assumed to be similar to the picture interests of the second person, and vice versa. The persons may be "similar" based on their demographics and expressed preferences. This approach is particularly useful when only a small number of images with preferred characteristics are available for a particular person, say fewer than five or ten; the set of the images with desirable characteristics for that person may then be supplemented with the images with desirable characteristics of one or more other persons who are similar to the person.

When a user's choice is not available, the interest operator may default to information theory principles. In particular, for each image a vector representing the facial expressions in the image may be obtained. For each vector v, its information value in bits may be computed, e.g., the negative logarithm base 2 of the probability of the vector: $I(v)=-\log 2(p(v))$. In embodiments, the probability may be estimated in reference to large databases of naturally occurring facial expressions. In embodiments, the probability may be computed with respect to the specific collection of images under analysis. The probability estimates may be obtained using a multidimensional Gaussian model; generalizations such as Independent Component Analysis, Mixture of Gaussians, and/or Sparse Coding Models.

In step 215, the system 100 determines an "interest operator" based on the pictures with the desirable content. (In variants, the interest operator is predetermined, so there may effectively be no need for the step 215.) This will be described in more detail below.

In step 220, the system 100 applies the "interest operator" to a picture in the collection, to calculate interest index for the picture. This will also be described in more detail below.

In decision block 225, the system 100 decides whether an interest index should be calculated for another picture in the collection. For example, another picture may need to be processed and its interest index calculated until a predetermined number or all of the pictures in the collection have been processed and their interest indices calculated. If interest index for another picture is to be calculated, process flow continues to step 227 to select another picture and then returns to the step 220.

Otherwise, the process flow continues to decision block 230, in which the system 100 compares the interest index for a picture from the collection to an interest threshold. The interest threshold may be predetermined, for example, preset by the provider of the system 100, or it can be selected by the user (such as by a sliding control), or set in another way. If the interest index of the picture exceeds (in a variant, equals or exceeds) the threshold, the picture is considered to be of interest and the process flow advances to step 235.

In the step 235, the system 100 (1) takes one or more first predetermined actions relating to the picture, and/or (2) abstains from taking one or more second predetermined actions relating to the picture. For example, the metadata of the picture may be changed to indicate that the picture is of interest, the picture may be stored or moved to a particular file or directory, the picture may be displayed, or the picture is simply not erased.

If the interest index of the picture does not exceed (in a variant, falls below) the threshold, the system 100 continues to step 240 to (3) take one or more third predetermined actions relating to the picture, and/or (4) abstain from taking one or more fourth predetermined actions relating to the picture. For example, the metadata of the picture may be changed to indicate that the picture is of no interest, the picture may be stored or moved to a particular file or directory, the picture is not displayed, or the picture may be erased.

From the step 235 or the step 240, as the case may be, the system 100 proceeds to decision block 250, to decide whether another picture should be processed in the steps/block 230/235/240. If so, the process flow continues to step 255 to select another picture and then returns to the input of the decision block 230. If not, the process 200 terminates in flow point 299, to be repeated as needed.

The interest operator previously mentioned may be a process and/or parameters for applying to a vector of a given picture (e.g., a picture from the collection) to determine its relation to one or more commonalities of the pictures with the desirable characteristics. In one example, a predetermined percentage (e.g., >30%, >40%, >50%, >60%, >70%, >80%) of the vectors of the pictures with the desirable characteristics are such that their end points fall within a predetermined Euclidean distance of some point computed in the step 215 (the "preference point"); the preference point may be selected so as to maximize the number of vectors of the pictures with the desirable characteristics within the predetermined Euclidean distance of that point, or as the endpoint of the average of the vectors of the pictures with the desirable characteristics, or otherwise. The interest operator may then be the inverse of the distance between the vector of the given picture and the preference point, and be compared to the interest threshold in the decision block 230.

In another example, the interest index may be the dot product of the vector of the given picture and the vector ending in the preference point. The dot product is then compared to the interest threshold in the decision block 230.

In another example, the preference operator includes calculating the magnitude of the vector of the given picture, if the average vector magnitude of the pictures with the desirable characteristics is large. In other words, if the pictures with the desirable characteristics exhibit strong emotion content, the interest operator is the magnitude of the vector of the given picture, and the pictures selected from the collection for the step 235 are those that have emotion content above the interest threshold. The interest threshold may be, for example, a predetermined value, or a predetermined percentage of the magnitude of the average of the vectors of the pictures with desirable characteristics.

In still another example, the interest operator includes a comparison between the direction of the vector of the given picture and the direction of the average of the vectors of the pictures with the desired characteristics.

In other and related examples, mean expression vector, Covariance Matrix, maximum of each emotion channel (classifier), number of faces in a picture, and/or sum of outputs for expression channels/classifiers may be used as whole or part of the interest operator.

Several operators (such as those described above) may be applied and their results averaged or otherwise combined to obtain the interest index for the given image.

Figure 3:
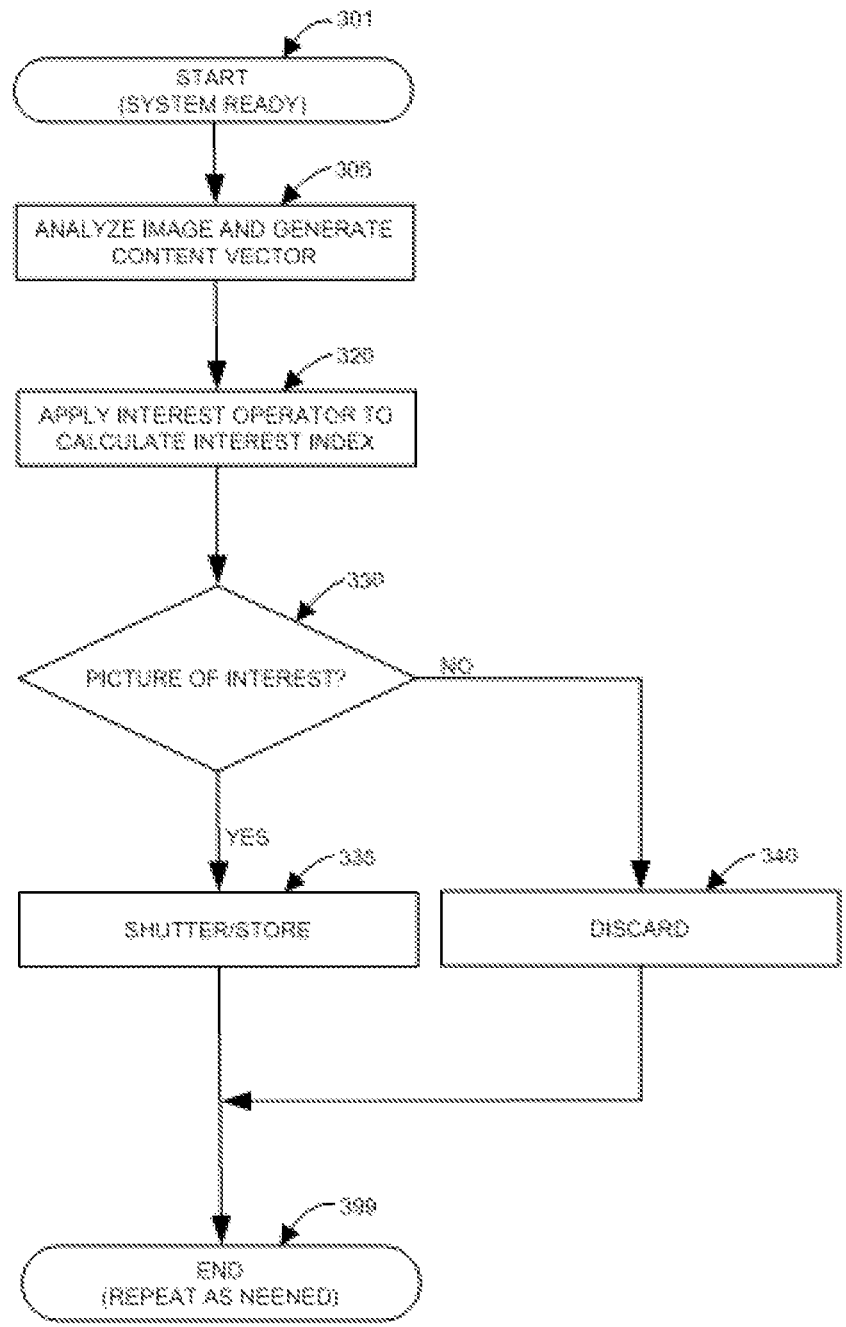
FIG. 3 illustrates selected steps/blocks of a process for shuttering images.

FIG. 3 illustrates selected steps of a process 300 for shuttering an image on an image sensor. A system analogous or identical to the system 100 may be used to perform this process; in a particular example, the process 300 is performed by a camera, which may be a dedicated imaging device, or part of another system, such as a smartphone or a mobile device.

At flow point 301, the system is powered up and configured to perform the steps of the process 300.

In step 305, the system analyzes the image on the sensor, which may be done in a manner identical or analogous to the analysis in the step 205 of the process 200, described above. A vector of ordered values of the classifiers is thus obtained for the sensor image.

In step 320, the system applies an interest operator to the image, to calculate interest index for the image. The step 320 may be identical or analogous to the step 220 of the process 200, described above.

In decision block 330, the interest index of the image is compared to an interest threshold, in a manner identical or analogous to the operation of the decision block 230 of the process 200. If the interest index of the image exceeds (in variants, equals or exceeds) the interest threshold, the image is considered to be of interest and is consequently stored in a non-transient memory storage device, in step 335; as part of the step 335, other actions may also be performed, and the system may abstain from still other actions. Otherwise, the image is discarded, in step 340, and possibly other actions are performed.

Process flow then terminates in flow point 399, to be repeated as needed.

Example of possible applications of the system and process features described in this document follow. The system and process features are not limited to these examples.

In a first example, a still or video camera may capture an audience watching a sporting event, concert, or other event. Images of many people may be captured by the camera at once. The images of each person or small groups of people may be separately filtered (i.e., as if individual images were captured of each person or group), for example to select images of people or small groups with a particular type of facial expression or other image feature.

In a second example, a digital camera may take a picture of a group. A user may hold down the camera shutter button, triggering the camera to take dozens or hundreds of images. The camera may then filter the images for ones that include a particular type of facial expression or other image feature.

In a third example, a collection of cameras may track people in a retail environment or some other public place. The collection of cameras may collectively generate too much video for convenient review by one or more people. Filtering as described in this document may be used to select images or video segments that are interesting in terms of emotional content (e.g., angry customers, happy customers, etc.) and send them to an analyst while erasing the rest of the images or video.

The system and process features described throughout this document may be present individually, or in any combination or permutation, except where presence or absence of specific feature(s)/element(s)/limitation(s) is inherently required, explicitly indicated, or otherwise made clear from the context.

Although the process steps and decisions (if decision blocks are present) may be described serially in this document, certain steps and/or decisions may be performed by separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples use the particular order(s) in which the steps and decisions (if applicable) are shown and/or described.

The instructions (machine executable code) corresponding to the method steps of the embodiments, variants, and examples disclosed in this document may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other form of non-transitory storage medium known in the art, whether volatile or non-volatile. Exemplary storage medium or media may be coupled to one or more processors so that the one or more processors can read information from, and write information to, the storage medium or media. In an alternative, the storage medium or media may be integral to one or more processors.

This document describes in detail the inventive apparatus, methods, and articles of manufacture for estimating quality of interaction and providing suggestions for improving future interactions. This was done for illustration purposes only. The specific embodiments or their features do not necessarily limit the general principles underlying the disclosure of this document. The specific features described herein may be used in some embodiments, but not in others, without departure from the spirit and scope of the invention(s) as set forth herein. Various physical arrangements of components and various step sequences also fall within the intended scope of the disclosure. Many additional modifications are intended in the foregoing disclosure, and it will be appreciated by those of ordinary skill in the pertinent art that in some instances some features will be employed in the absence of a corresponding use of other features. The illustrative examples therefore do not necessarily define the metes and bounds of the invention(s) and the legal protection afforded the invention(s).

What is claimed is:

1. A computer-implemented method for image filtering, the method comprising:

analyzing, by a computer, an image using a plurality of classifiers corresponding to one of a plurality of characteristics;

generating, by the computer, a content vector for the image, wherein the content vector comprises a plurality of values, wherein each value corresponds to a classifier of the plurality of classifiers;

applying, by the computer, an interest operator to the content vector, wherein the interest operator is based on a plurality of pictures with desirable characteristics, thereby obtaining an interest index for the image represented by the content vector;

comparing, by the computer, the interest index for the image to an interest threshold to obtain a result; and taking one or more actions by the computer based on the result.

2. The computer-implemented method according to claim 1, wherein the interest operator is predominantly based on content of one or more expressions of one or more faces in the plurality of pictures.

3. The computer-implemented method according to claim 2, wherein the desirable characteristics relate to emotional content or sentiment in the expressions.

4. The computer-implemented method according to claim 1, wherein the interest operator is predominantly based on content of one or more human appearance characteristics in the plurality of pictures.

5. The computer-implemented method according to claim 1, wherein the interest operator is predominantly based on content of one or more action units in the plurality of pictures.

6. The computer-implemented method according to claim 1, wherein the interest operator is predominantly based on content of one or more low level features in the plurality of pictures.

7. The computer-implemented method according to claim 1, wherein the image is captured by a camera viewing an audience of an event.

8. A system comprising:

one or more processors; and a memory coupled to the one or more processors and comprising computer code which, when executed by the one or more processors, causes the one or more processors to:

analyze an image using a plurality of classifiers corresponding to one of a plurality of characteristics;

generate a content vector for the image, wherein the content vector comprises a plurality of values, wherein each value corresponds to a classifier of the plurality of classifiers;

apply an interest operator to the content vector, wherein the interest operator is based on a plurality of pictures with desirable characteristics, thereby obtaining an interest index for the image represented by the content vector;

compare the interest index for the image to an interest threshold, to obtain a result; and take one or more actions based on the result.

9. The system according to claim 8, wherein the interest operator is predominantly based on content of one or more expressions of one or more faces in the plurality of pictures.

10. The system according to claim 9, wherein the desirable characteristics relate to emotional content or sentiment in the expressions.

11. The system according to claim 8, wherein the interest operator is predominantly based on content of one or more human appearance characteristics in the plurality of images.

12. The system according to claim 8, wherein the interest operator is predominantly based on content of one or more action units in the plurality of images.

13. The system according to claim 8, wherein the interest operator is predominantly based on content of one or more low level features in the plurality of images.

14. The system according to claim 8, wherein the plurality of images are captured by a camera viewing an audience of an event.

15. A non-transitory machine-readable medium embedded with computer code for image filtering executable by one or more processors to:
   analyze, by a computer, an image using a plurality of classifiers corresponding to one of a plurality of characteristics;
   generate, by the computer, a content vector for the image, wherein the content vector comprises a plurality of values, wherein each value corresponds to a classifier of the plurality of classifiers;
   apply an interest operator to the content vector, the interest operator being based on a plurality of pictures with desirable characteristics, thereby obtaining an interest index for the image;
   comparing the interest index for the image to an interest threshold to obtain a result; and
   taking one or more actions based on the result.

16. The computer readable medium according to claim 15, wherein the interest operator is predominantly based on content of one or more expressions of one or more faces in the plurality of pictures.

17. The computer readable medium according to claim 16, wherein the desirable characteristics relate to emotional content or sentiment in the expressions.

18. The computer readable medium according to claim 15, wherein the interest operator is predominantly based on content of one or more human appearance characteristics in the plurality of pictures.

19. The computer readable medium according to claim 15, wherein the interest operator is predominantly based on content of one or more action units in the plurality of pictures.

20. The computer readable medium according to claim 15, wherein the interest operator is predominantly based on content of one or more low level features in the plurality of pictures.

* * * * *